Figures 1, 2, 3:
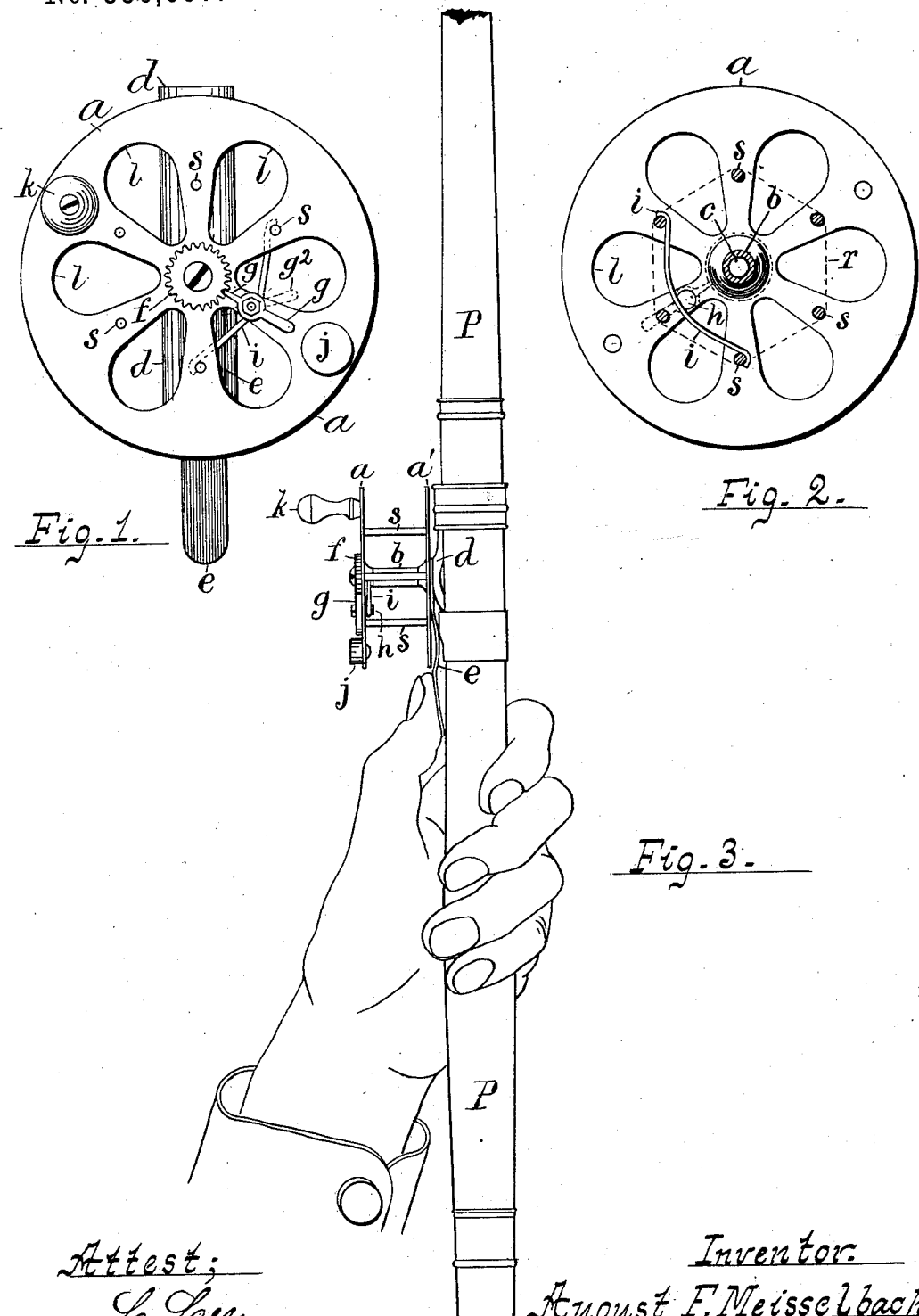

(No Model.)

A. F. MEISSELBACH.
FISHING REEL.

No. 336,657.  Patented Feb. 23, 1886.

Attest:
L. Lee.
Henry J. Theberath.

Inventor.
August F. Meisselbach,
per Crane & Miller, Attys.

UNITED STATES PATENT OFFICE.

AUGUST F. MEISSELBACH, OF NEWARK, NEW JERSEY.

FISHING-REEL.

SPECIFICATION forming part of Letters Patent No. 336,657, dated February 23, 1886.

Application filed November 21, 1885. Serial No. 183,491. (No model.)

*To all whom it may concern:*

Be it known that I, AUGUST F. MEISSELBACH, a citizen of the United States, residing in Newark, Essex county, New Jersey, have invented certain new and useful Improvements in Fishing-Reels, fully described and represented in the following specification and the accompanying drawings, forming a part of the same.

This invention consists in certain specific constructions, hereinafter described.

In the drawings, Figure 1 is a side view of the reel with its foot detached from the pole. Fig. 2 is an inside view of the outer flange, the reel-pipe and barrel-pins being shown in section; and Fig. 3 is an edge view of the reel attached to a pole with the drag pressed from the flange of the reel by the hand of the operator.

$a$ is the outer flange of the reel, and $a'$ the inner flange; $b$, a pipe uniting the flanges at the center; $c$, the stud on which the reel revolves, and $s$ a series of transverse pins secured between the flanges, at a considerable distance from the pipe $b$.

$d$ is the foot, by which the stud is attached to the fish-pole in the usual manner.

P is the pole, and $e$ the drag-spring attached to the foot or to the stud between the reel and the foot, so as to lie between the inner flange, $a'$, and the pole when in use.

Upon the outer end of the stud is affixed the ratchet-wheel $f$, and $g$ is the click attached to an arbor which is passed through the flange $a$, and is formed upon its opposite end with a round head, $h$, flattened on one side, against which head is fitted a spring, $i$. The spring consists of a piece of wire resting at its middle upon said flattened head, and bearing at its opposite ends upon the inner side of two of the reel-pins $s$.

$g'$ is a handle projected from the click upon the opposite side of its arbor, so that the operator can readily throw the click out of the ratchet $f$ into an inoperative position, as at $g^2$, the spring $i$ then pressing upon the round part of the head $h$, and serving to retain the click in such position.

The drag-spring $e$ operates by frictional contact with the flat side of the flange $a'$, being normally bent to spring toward the flange with the desired force; but when pressed toward the pole by the operator, as shown in Fig. 3, the reel is entirely relieved from its retarding influence.

$j$ is a counterbalance-weight affixed to the reel, opposite the crank $k$, to prevent the reel from turning voluntarily by the unbalanced weight of the crank.

The flanges are provided with openings $l$, for the purpose of ventilating the line to dry the same, such drying being further secured by the winding of the reel upon the transverse pins $s$, and the arrangement of said pins at a sufficient distance from the pipe $b$ to permit the circulation of air within the pins. With six pins, as shown in the drawings, the line evidently winds into a six-sided form, as indicated by the dotted line $r$ in Fig. 2, and the openings $l$ are shown extended within and without such dotted line, to permit the access of air to the line at the sides of the reel, as well as to the space within the pins.

I am aware of United States Patent No. 244,828, showing a drag-spring attached to a reel-stud; but in the construction shown therein the spring has an offset or shoulder which bears upon the flange of the reel, while in my construction the drag operates against the flat surface of the flange, and in pressing it outward creates an increased friction by forcing the same against the head of the stud.

I am also aware that a reversible click is not new; but heretofore the spring for holding such click in place has been rigidly attached at one end, with its other end pressed against the flattened head attached to the click, while in my construction the spring rests at each end against the reel-pins, and at the center of its length presses against the head $h$. My ratchet-wheel is also stationary upon the reel-stud, while others have heretofore been attached to the reel.

I am also aware of United States Patent No. 95,839, showing central ventilating-holes in the reel-flanges, which are connected together by pins upon which the line is wound, said reel-flanges being supported in the frame by means of plates recessed to form bearings for the peripheries of the reel-flanges, while in my invention the reel-flanges are united centrally by the pipe $b$, rotating freely upon the stud $c$.

I wholly disclaim the above patents, limiting myself to the constructions herein shown and described.

I claim—

1. The combination, with the reel-stud $c$ and the reel $a\ a'\ b$, mounted thereon, of the spring-drag $e$, affixed to the stud $c$ or its foot and formed with a flat face to bear against the flange of the reel at the flat side thereof, the whole arranged and operated as and for the purpose set forth.

2. The combination, with the stud $c$, the reel formed with flanges $a\ a'$ and pins $s$, and the ratchet-wheel $f$, secured to the outer end of the stud, of the click $g$, pivoted upon the flange of the reel, the flattened head $h$, attached to the click, and the spring $i$, having its ends fitted against the pins $s$ and its middle pressing against the flattened head, as and for the purpose set forth.

3. The combination, with the stud $c$, of the reel constructed with the side flanges, $a\ a'$, the flanges being united by a pipe, $b$, fitted to sustain the reel upon the stud and provided with the transverse pins $s$, adapted to sustain the line, and the series of holes $l$, arranged and operated to ventilate the space within the pins $s$, as and for the purpose set forth.

In testimony whereof I have hereunto set my hand in the presence of two subscribing witnesses.

AUGUST F. MEISSELBACH.

Witnesses:
 THOS. S. CRANE,
 L. LEE.